No. 813,847. PATENTED FEB. 27, 1906.
H. C. WALLACE.
BAND CUTTER AND FEEDER.
APPLICATION FILED JAN. 12, 1905.

2 SHEETS—SHEET 1.

Witnesses

Inventor
H. C. Wallace
By
Attorneys

No. 813,847. PATENTED FEB. 27, 1906.
H. C. WALLACE.
BAND CUTTER AND FEEDER.
APPLICATION FILED JAN. 12, 1905.
2 SHEETS—SHEET 2.
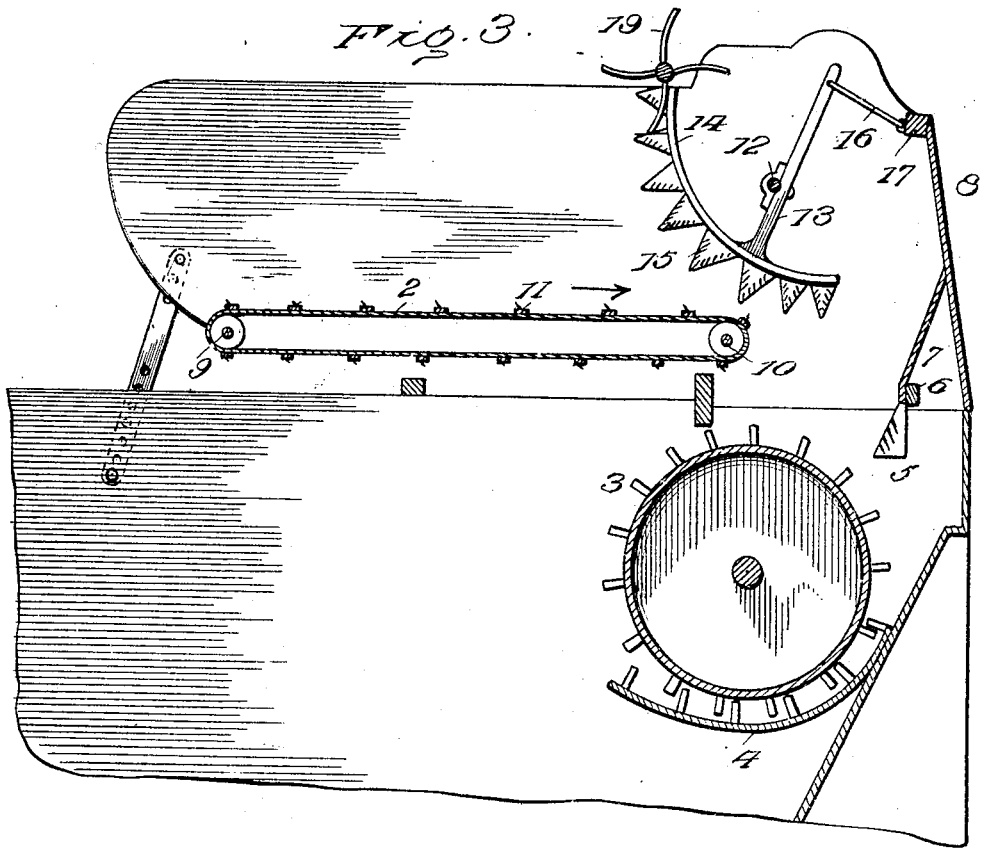
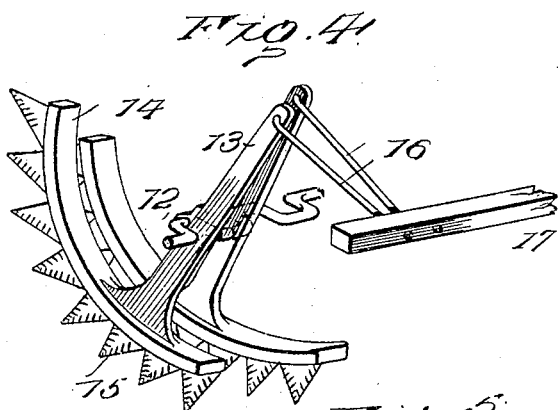
Witnesses
Chas. Norris
Inventor
H. C. Wallace
by
R. M. Macey.
Attorneys

UNITED STATES PATENT OFFICE.

HALBERT C. WALLACE, OF McPHERSON, KANSAS.

BAND-CUTTER AND FEEDER.

No. 813,847.

Specification of Letters Patent.

Patented Feb. 27, 1906.

Application filed January 12, 1905. Serial No. 240,800.

*To all whom it may concern:*

Be it known that I, HALBERT C. WALLACE, a citizen of the United States, residing at McPherson, in the county of McPherson and State of Kansas, have invented certain new and useful Improvements in Band-Cutters and Feeders, of which the following is a specification.

This invention provides a novel form of band-cutter and feeder for threshing-machines; and it consists of the combinations of parts and structural features which hereinafter will be more fully described and claimed, and shown in the accompanying drawings, in which—

Figure 1:
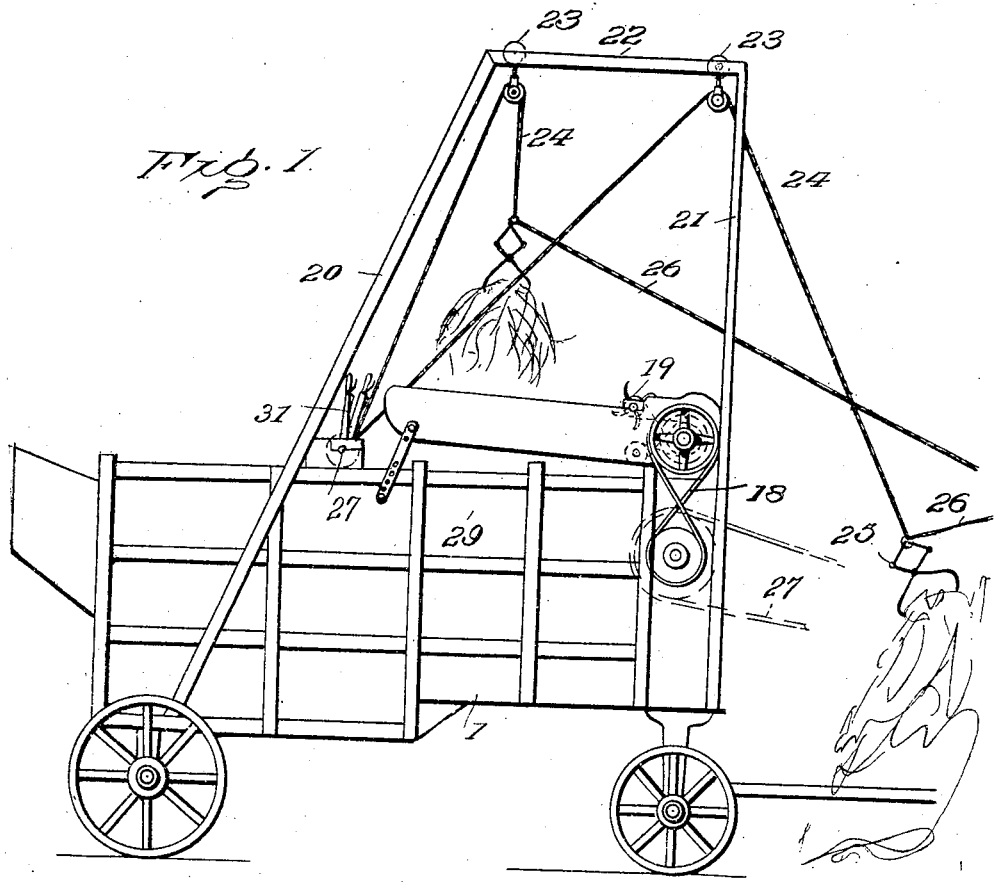
Figure 2:
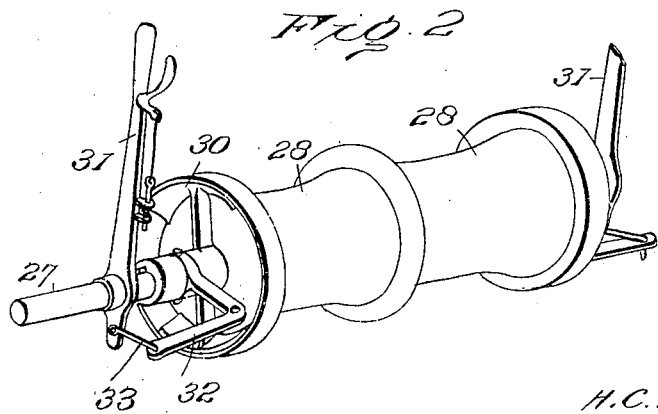

Figure 1 is a side view of a separator embodying the invention. Fig. 2 is a detail perspective view of the drums and coöperating clutches of the hoisting or hay derrick. Fig. 3 is a longitudinal section of the band-cutter and feeder and the threshing mechanism. Fig. 4 is a detail perspective view of a pair of band-cutters. Fig. 5 is a detail perspective view of the knives for preventing choking of the threshing mechanism.

Corresponding and like parts are referred to in the following description and indicated in all the views of the drawings by the same reference characters.

The separator and threshing mechanism may be of any usual construction and are illustrated to demonstrate the application of the invention.

The body of the separator is indicated at 1, and the endless carrier of the feeder is designated by the reference-numeral 2. The band-cutter and feeder is mounted upon the separator and is located wholly above the same, thereby economizing space and enabling the separator to form a sole support therefor. The threshing mechanism comprises the toothed cylinder 3 and toothed concave 4, the grain being fed thereto from above. A series of knives 5 are arranged at the entrance to the threshing mechanism and are adapted to catch any uncut bands which might pass the other knives and to force grain into the threshing mechanism. The front edge of the knives 5 are bearded or toothed, so as to insure positive engagement with the band and insure severance thereof. The knives 5 are ranged transversely of the machine and are attached to a supporting-bar 6 in any substantial manner. A plate 7 constitutes a guide and projects upward from the bar 6 and inclines slightly to the rear toward its upper edge. The plate 7 in conjunction with a downwardly and rearwardly inclined plate 8 prevents any grain passing over the rear side of the cylinder and insures its entrance into the threshing mechanism.

The endless carrier 2 is supported at its ends upon rollers 9 and 10 and is adapted to be raised and lowered at its front end, as may be required. The carrier 2 may be of ordinary construction and comprises lags 11, provided with teeth which incline upwardly and forwardly to enable them to clear the grain when retarded by the band-cutting knives. The carrier is driven so that its upper portion travels forward to move the grain to the band-cutters and advance it to the threshing mechanism.

A crank-shaft 12 extends transversely of the feeder and is located above the delivery end of the carrier, and its crank portions pivotally support arms 13, which are provided at their lower ends with curved bars 14, carrying blades 15, constituting the band-cutters. The blades 15 preferably have their edges bearded or toothed, so as to cut the bands with greater facility. Links 16 connect the upper ends of the arms 13 with a transverse bar or rod 17 and insure proper oscillatory movement of the arms 13 during rotation of the crank-shaft 12. Movement is imparted to the crank-shaft 12 in any manner, and, as shown, it is connected by belt 18 with a pulley on the end of the shaft of the threshing-cylinder.

A retarder 19 is arranged above the delivery end of the carrier and is adapted to rotate slowly and serves to hold back bunches of grain to give the knives a chance to tear the bunches apart. The retarder consists of a shaft and arms and is rotated at such relative speed and in a direction to cause the lowermost arms to travel in the same direction as and at a considerably slower speed than the upper portion of the carrier 2. As a result of the operation of the retarder the upper portion of the grain is moved more slowly than the lower portion toward the band-cutting knives and prevented from crowding thereon.

The grain hoist or derrick is mounted upon the separator and comprises uprights 20 and 21 and a cross-piece 22, the latter forming a track for a trolley 23 to run upon. It is to be understood that each side of the separator will be similarly equipped with corresponding parts 20, 21, and 22. Hoisting ropes or cords 24 pass over sheave-pulleys carried by the respective trolleys 23, and each is provided with a hay-fork 25, controlled by means of a directing-cord 26. Operating mechanism for the hoisting ropes or cords comprises a shaft 27, drums 28, loose upon the shaft 27, and a clutch mechanism coöperating with each drum for securing it to the shaft when required. Each of the hoisting-ropes 24 is attached to a drum 28 so as to wind thereon. The shaft 27 is continuously driven and may be connected to any moving part of the machine—as, for instance, to a pulley of the threshing-cylinder shaft—by means of a belt 29. A friction-clutch 30 is secured to each end portion of the shaft 27 by means of a feather-and-spline connection, so as to rotate therewith, and is movable toward and from the adjacent end of the drum by means of lever 31, bell-crank 32, and link 33. When the clutch 30 is moved inward to make engagement with the drum, the latter is rotated to wind up the hoisting-rope 24, thereby elevating the fork and the load carried thereby. When the load reaches a point over the feeder, the clutch is unshipped, thereby permitting the load to descend and at the same time permitting the fork to be drawn to the stack or wagon by means of the cord 26. It is to be understood that the hay-fork may be tripped in any accustomed way, either by a pull upon the cord or by coming in contact with a trip.

It is noted further that the teeth applied to the lags of the carrier 2 not only incline to clear the grain, but serve to retard the lower portion of a bunch while the upper part is torn away by the knives of the band-cutter. The retarder 19 is driven at a slower speed than the carrier, and as a result the upper portion of a bunch of grain is held back while the lower portion is advanced more rapidly.

Having thus described the invention, what is claimed as new is—

1. In combination, a threshing mechanism, a downwardly and rearwardly inclined plate located above the threshing mechanism and at the rear side thereof, a transverse bar located a short distance from the lower edge of said plate, a second plate connected at its lower edge with said bar and inclined upwardly and rearwardly and forming a close joint at its upper edge with the first-mentioned plate, knives secured to said transverse bar, a feeder located forward of and above the threshing mechanism, and a band-cutter arranged above the delivery end of said feeder and acting jointly therewith to advance the grain and retard the upper portion thereof.

2. In combination, a threshing mechanism, a downwardly and rearwardly inclined plate located above the threshing mechanism and at the rear side thereof, a transverse bar located a short distance from the lower edge of said plate, a second plate connected at its lower edge with said bar and inclined upwardly and rearwardly and forming a close joint at its upper edge with the first-mentioned plate, knives secured to said transverse bar, a feeder located forward of and above the threshing mechanism, oscillatory band-cutters operating over the entrance to the threshing mechanism and above the delivery end of the feeder, and a rotary retarder located above the forward end of said oscillatory band-cutters.

In testimony whereof I affix my signature in presence of two witnesses.

HALBERT C. WALLACE. [L. S.]

Witnesses:
A. L. NASH,
W. C. WALLACE.